(12) United States Patent
Park et al.

(10) Patent No.: US 11,927,974 B2
(45) Date of Patent: Mar. 12, 2024

(54) FLOW RATE CONTROL DEVICE WITH COMPLIANT STRUCTURE

(71) Applicant: Korea Aerospace Research Institute, Daejeon (KR)

(72) Inventors: Kwang Kun Park, Daejeon (KR); Jun Seong Lee, Daejeon (KR); Kee Joo Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 13 days.

(21) Appl. No.: 17/528,365

(22) Filed: Nov. 17, 2021

(65) Prior Publication Data

US 2022/0163982 A1 May 26, 2022

(30) Foreign Application Priority Data

Nov. 20, 2020 (KR) .................. 10-2020-0156225

(51) Int. Cl.
*G05D 7/01* (2006.01)
*F02K 9/60* (2006.01)

(52) U.S. Cl.
CPC ............. *G05D 7/012* (2013.01); *F02K 9/605* (2013.01)

(58) Field of Classification Search
CPC .... Y10T 137/7792; G05D 7/012; F02K 9/605
USPC ........................................................ 251/902
See application file for complete search history.

(56) References Cited

U.S. PATENT DOCUMENTS

| 2,584,418 A | * | 2/1952 | Branson | ............... G05D 7/0133 137/504 |
| 3,565,105 A | * | 2/1971 | Murakami | ............. G05D 7/012 137/504 |
| 4,306,585 A | * | 12/1981 | Manos | ................. G05D 7/0133 137/504 |
| 4,887,637 A | * | 12/1989 | Ketner | ................. G05D 7/0133 137/504 |

(Continued)

FOREIGN PATENT DOCUMENTS

| FR | 1128158 A | * | 1/1957 |
| JP | 44-012547 | | 5/1969 |

(Continued)

OTHER PUBLICATIONS

Machine Translation of FR1128158A retrieved from espacenet.com Jan. 2023 (Year: 2023).*

(Continued)

*Primary Examiner* — Jessica Cahill
(74) *Attorney, Agent, or Firm* — Blank Rome LLP

(57) ABSTRACT

The flow rate control device includes a main plate corresponding to an inner diameter and including a through hole which is formed at the center thereof and through which a fluid flows, a sub-plate corresponding to a size of the through hole, disposed in front of the main plate, and applied with a pressure of the flowing fluid, and an expansion and contraction flow path formed to connect the through hole and a circumference of the sub-plate to each other and expanded and contracted by the pressure applied to the sub-plate. The expansion and contraction flow path includes a plurality of holes which are formed in a side surface thereof and through which the flow flows, and has a cross-sectional area changed by the pressure to control a flow rate.

7 Claims, 18 Drawing Sheets

(56) References Cited

U.S. PATENT DOCUMENTS

| | | | | |
|---|---|---|---|---|
| 6,196,259 B1* | 3/2001 | Weber | ............... | G05D 7/0133 |
| | | | | 137/504 |
| 7,399,169 B2* | 7/2008 | Nakamura | ............ | F04B 49/225 |
| | | | | 417/559 |
| 2017/0234440 A1* | 8/2017 | Detmers | ............... | F16K 3/34 |
| | | | | 251/118 |

FOREIGN PATENT DOCUMENTS

| JP | 7-267198 H | 10/1995 |
|---|---|---|
| JP | 9-257143 H | 9/1997 |

OTHER PUBLICATIONS

Office Action issued in corresponding KR Application No. 10-202000156225 dated Jun. 3, 2022.

\* cited by examiner (b)

PRIOR ART

PRIOR ART

FLOW RATE CONTROL DEVICE WITH COMPLIANT STRUCTURE

CROSS-REFERENCE TO RELATED APPLICATIONS

This application claims priority under 35 U.S.C. § 119 to Korean Patent Application No. 10-2020-0156225, filed on Nov. 20, 2020, in the Korean Intellectual Property Office, the disclosure of which is incorporated herein by reference in its entirety.

TECHNICAL FIELD

The following disclosure relates to a flow rate control device for discharging a constant flow rate, and more particularly, to a flow rate control device provided inside a pipe and discharging a constant flow rate even though a pressure of a supplied fluid changes.

BACKGROUND

A projectile is loaded with a gas for pressuring a propellant and driving a valve, and consumes the propellant and the gas with the passage of flight time. A pressurization system of a liquid rocket supplies the propellant at a pressure equal to or higher than a required pressure at an inlet of an engine. The pressurization system of the liquid rocket controls a flow rate of a pressurization gas so that a pressure in a propellant tank during flight is maintained within a certain range in consideration of an allowable pressure of the tank. A regulator or a plurality of control valves are applied in order to maintain the pressure in the propellant tank while the pressurization gas in a pressurization gas container is consumed.

The projectile is loaded with a propellant and a gas, and generally consumes the propellant and the gas within several minutes. Among subsystems that use the propellant and the gas, there are subsystems that require a supply of the propellant or the gas at a constant flow rate or pressure. The subsystems include a mechanically complicated regulator, multiple control valves, or the like, in order to satisfy a constant flow rate or pressure. The regulator having a complicated internal structure or an increase in the number of control valves may reduce reliability and economic efficiency of the projectile.

In general, the pressurization gas is stored in a separate high-pressure gas tank. As the pressurization gas is supplied to the propellant tank, a pressure inside the pressurization gas tank decreases. Flow rate control of the pressurization gas is performed by a regulator or one or more valves. When the regulator or a plurality of valves are applied, complicatedness of components increases, such that the reliability of the projectile pressurization system may decrease.

A test for performance and reliability of the subsystems other than an engine in a projectile development process is performed as a ground comprehensive test. An actual projectile supplies a constant flow rate of propellant to the engine using a pump of the engine. However, even at the time of the comprehensive test in which the engine is not mounted, all the subsystems are operated as in a real situation. The propellant is discharged into a ground facility tank by pressurizing the propellant tank. Since the propellant is discharged by a pressure and gravity in the propellant tank without the engine, a flow rate of the discharged propellant is not constant. At the time of discharging the propellant, with the passage of time, a head pressure by a level of the propellant decreases, and the flow rate of the discharged propellant also tends to decrease. Accordingly, changes in pressure, temperature, and the like, inside the propellant tank are different from those in the real situation, and there is a limit to simulating a flight situation.

SUMMARY

An embodiment of the present disclosure is directed to providing a flow rate control device with a compliant structure so as to discharge a constant flow rate by changing a cross-sectional area of a flow path according to a pressure of a supplied fluid.

In one general aspect, a flow rate control device formed inside a pipe through which a fluid flows includes: a main plate formed inside the pipe so as to face a fluid flow direction and including a through hole formed at the center thereof; a sub-plate disposed in front of the through hole of the main plate; and an expansion and contraction flow path having a shape of a column connecting the through hole and a circumference of the sub-plate to each other, discharging the fluid through a plurality of holes formed in a circular shape or a polygonal shape in a side surface thereof, and expanded and contracted by a pressure applied to the sub-plate.

The expansion and contraction flow path may be expanded and contracted in a front and rear direction of a fluid flow according to a magnitude of the pressure applied to the sub-plate, such that a flow rate of the discharged fluid becomes uniform.

The main plate, the sub-plate, and the expansion and contraction flow path may be formed integrally with each other.

A plurality of holes may be formed in the sub-plate.

The sub-plate may include a hole formed at the center thereof, and include a conical portion having a cross-sectional area gradually decreasing from the hole in the fluid flow direction and formed in a depressed shape.

A hole may be formed at the center of the sub-plate, and one ends of a plurality of guides having a rod shape may be attached to a rear surface of the sub-plate.

The other ends of the guides may be supported by a guide support frame installed in the through hole and be formed to penetrate through the through hole.

The guide support frame may include holes in the guides.

In another general aspect, a hydraulic-pneumatic system injecting a propellant inside a propellant tank by a pressure in a pressurization gas tank includes: a first flow path connecting the pressurization gas tank and the propellant tank to each other; and a second flow path connecting the propellant tank and an engine or a flow rate meter to each other, wherein at least one flow rate control device is provided in the first flow path, such that a pressurization gas of the pressurization gas tank constantly pressurizes the propellant.

At least one flow rate control device may be provided in the second flow path to inject a constant flow rate of the propellant regardless of an influence of the engine.

According to the present disclosure, by forming a flow path having an expansion and contraction property, a cross-sectional area of the expansion and contraction flow path changes according to a pressure of a supplied fluid, such that a constant flow rate may be discharged.

In addition, a device is not complicated, reliability is high, and a flow rate is controlled without performing an additional manipulation.

DETAILED DESCRIPTION OF EMBODIMENTS

Hereinafter, a flow rate control device according to the present disclosure having the configuration as described above will be described in detail with reference to the accompanying drawings.

[1] Overall Composition and Operation Principle

Figure 1:
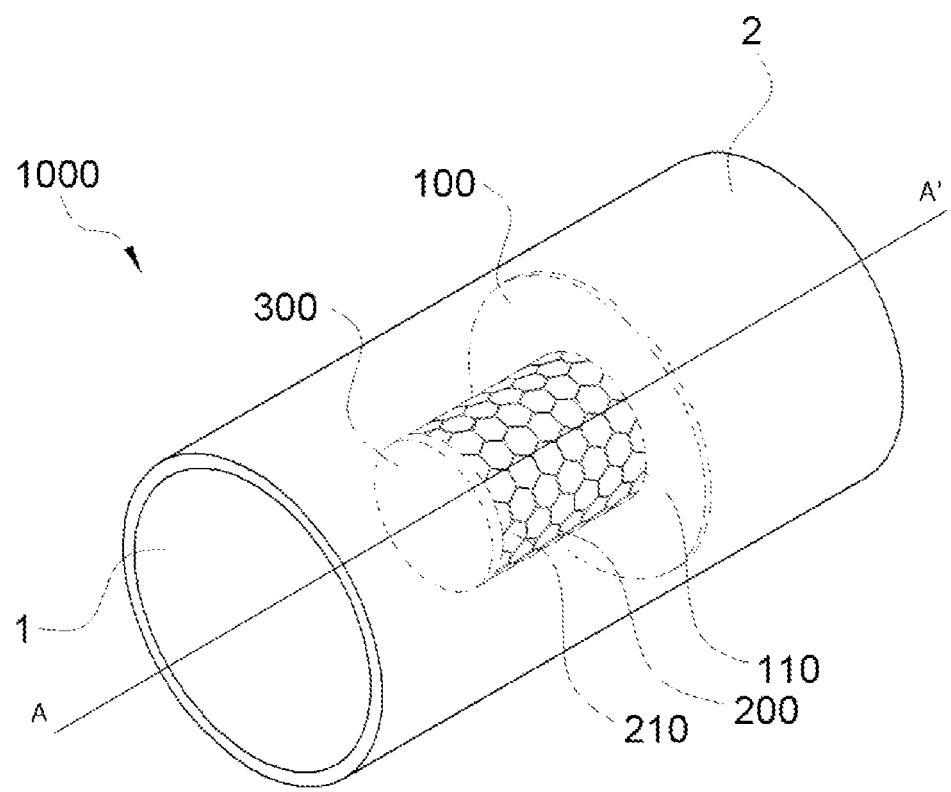
FIG. 1 is a configuration diagram according to the present disclosure.

First, FIG. 1 is a configuration diagram according to the present disclosure. Referring to FIG. 1, a flow rate control device 1000 is disposed in a pipe having an inlet 1 into which a fluid is introduced and an outlet 2, and includes a main plate 100, an expansion and contraction flow path 200, and a sub-plate 300. In more detail, the main plate 100 is formed to correspond to an inner diameter of the pipe, and is formed perpendicular to a fluid flow direction. A through hole 110 is formed at the center of the main plate 100, such that the fluid flows through the through hole 110. The sub-plate 300 corresponding to a size of the through hole 110 is disposed in front of the main plate 100, and is disposed perpendicular to the fluid flow direction so as to be applied with a pressure of the introduced fluid. The expansion and contraction flow path 200 is formed in the shape of a column connecting the through hole 110 and a circumference of the sub-plate 300 to each other. A side surface of the expansion and contraction flow path 200 may include a plurality of holes 210 through which the fluid may pass and which have a circular shape or a polygonal shape or may be formed in a pattern shape such as a grid shape, a rhombic shape, or a honeycomb shape. For this reason, the fluid passes through the expansion and contraction flow path 200, passes through the through hole 110 of the main plate 100, and then flows along the pipe.

Figure 2:
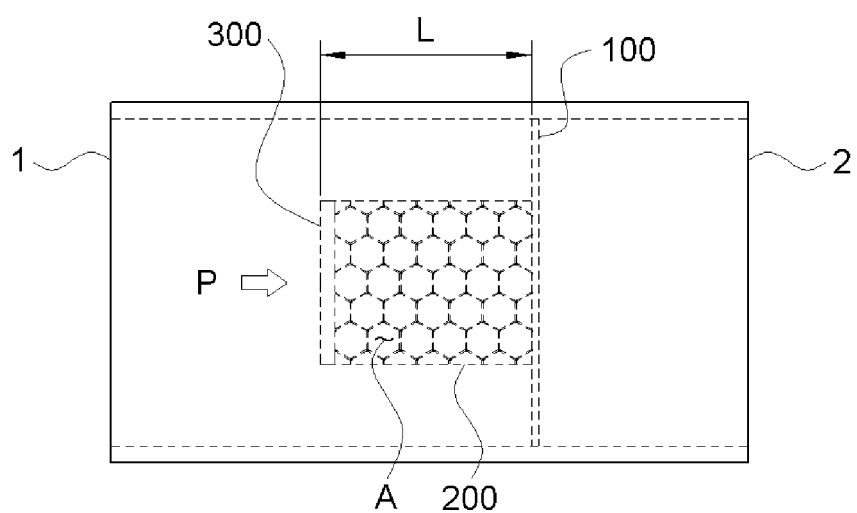
FIG. 2 is a cross-sectional view taken along line A-A' of FIG. 1.

FIG. 2 is a cross-sectional view taken along line A-A' of FIG. 1. Referring to FIG. 2, the fluid introduced into the inlet 1 is blocked by the main plate 100, and travels through the expansion and contraction flow path 200 and the through hole 110. When a pressure applied to the sub-plate 300 by the fluid introduced into the inlet 1 is P, a length of the expansion and contraction flow path 200 is defined as L, and a cross-sectional area of the hole 210 of the expansion and contraction flow path 200 is defined as A. When the fluid applies the pressure P to the sub-plate 300, the length L of the expansion and contraction flow path 200 decreases by the pressure P, and the cross-sectional area A of the hole 210 decreases, such that a flow is constantly controlled. In addition, when the pressure applied to the sub-plate 300 decreases, the length of the expansion and contraction flow path 200 is restored and the cross-sectional area of the hole 210 is restored, such that a flow of the fluid discharged through the expansion and contraction flow path 200 becomes uniform even though the pressure is changed. The flow rate control device 1000 is easily manufactured using a stacking manufacturing method because it is not necessary to assemble internal components. The main plate 100, the expansion and contraction flow path 200, and the sub-plate 300 are formed integrally with each other to increase reliability. Contents for the reliability will be described later.

[2] Second Embodiment

Figure 3:
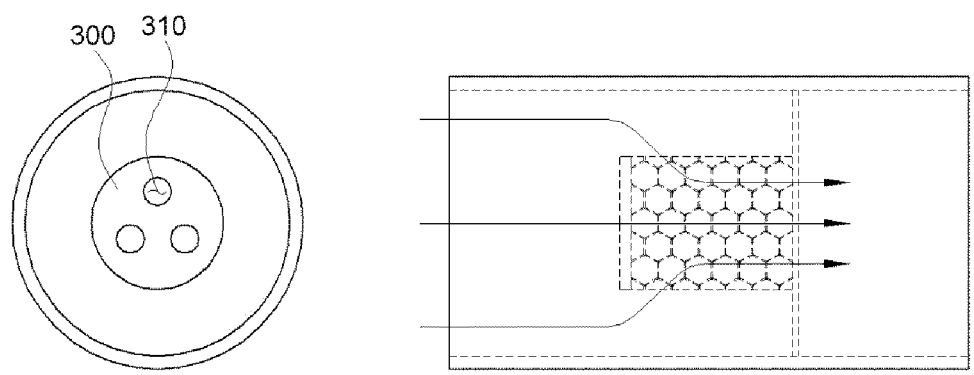
FIG. 3 is a configuration diagram according to a second embodiment.

FIG. 3 is a configuration diagram according to a second embodiment. Referring to FIG. 3, a main plate 100 is formed to correspond to an inner diameter of a pipe, and is formed perpendicular to a fluid flow direction. The main plate 100 includes a through hole 110 which is formed at the center thereof and through which a fluid flows. A sub-plate 300 corresponding to a size of the through hole 110 is disposed in front of the main plate 100, and is applied with a pressure of the fluid. An expansion and contraction flow path 200 is formed in the shape of a column connecting the through hole 110 and a circumference of the sub-plate 300 to each other. A side surface of the expansion and contraction flow path 200 may include a plurality of holes 210 through which the fluid may pass and which have a circular shape or a polygonal shape. Alternatively, a side surface of the expansion and contraction flow path 200 may be formed in a pattern shape such as a grid shape, a rhombic shape, or a honeycomb shape. The sub-plate 300 includes a plurality of holes 310 so that the fluid travels through the holes 310 as well as the expansion and contraction flow path 200. For this reason, the sub-plate 300 is not biased toward one side, and may be balanced.

[3] Third Embodiment

Figure 4:
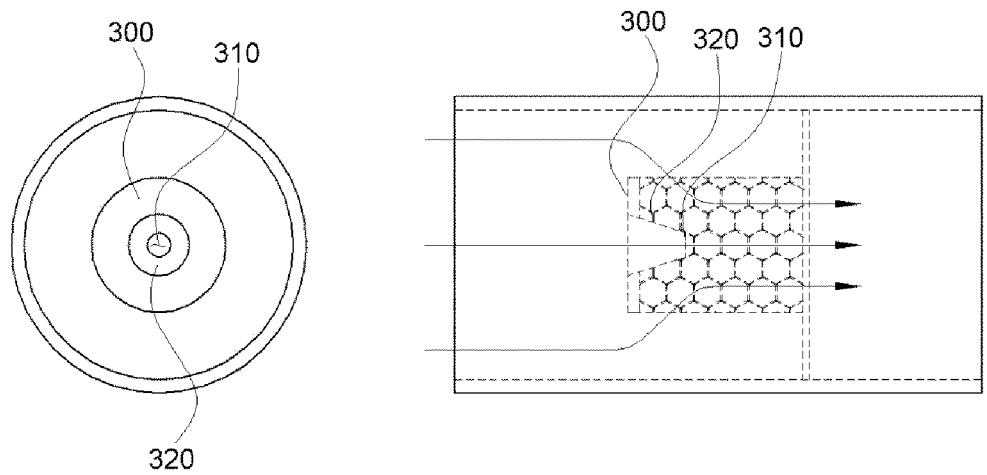
FIG. 4 is a configuration diagram according to a third embodiment.

FIG. 4 is a configuration diagram according to a third embodiment. Referring to FIG. 4, a main plate 100 is formed to correspond to an inner diameter of a pipe, and is formed perpendicular to a fluid flow direction. The main plate 100 includes a through hole 110 which is formed at the center thereof and through which a fluid flows. A sub-plate 300 corresponding to a size of the through hole 110 is disposed in front of the main plate 100 so as to be applied with a pressure of the fluid. An expansion and contraction flow path 200 is formed in the shape of a column connecting the through hole 110 and a circumference of the sub-plate 300 to each other. A side surface of the expansion and contraction flow path 200 may include a plurality of holes 210 through which the fluid may pass and which have a circular shape or a polygonal shape. Alternatively, a side surface of the expansion and contraction flow path 200 may be formed in a pattern shape such as a grid shape, a rhombic shape, or a honeycomb shape. The sub-plate 300 includes a hole 310 formed at the center thereof. The sub-plate 300 includes a conical portion 320 having a cross-sectional area gradually decreasing from the hole 310 in the fluid flow direction and formed in a depressed shape. This is similar to an apex vent principle of a parachute. Air trapped under the parachute will try to escape to any one corner. The parachute naturally leans to one side. In order to prevent this, the parachute includes a hole at the top thereof. As such, the sub-plate 300 includes the hole 310 at the center thereof in order to prevent the sub-plate 300 from being applied with a force and leaning to one side.

[4] Fourth Embodiment

Figure 5A:
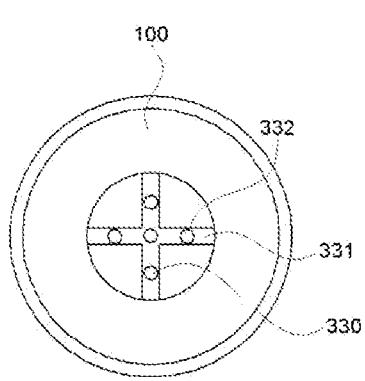
FIGS. 5A and 5B are configuration diagrams according to a fourth embodiment.
Figure 5A:
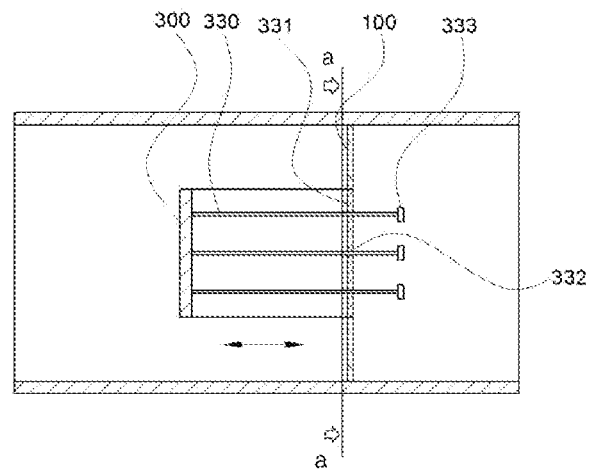
Figure 5B:
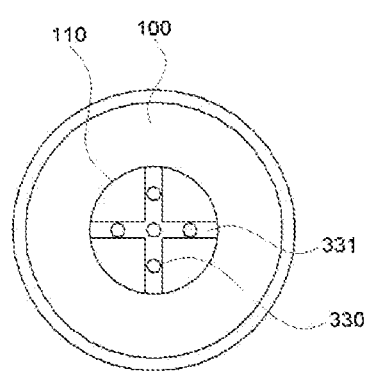
Figure 5B:
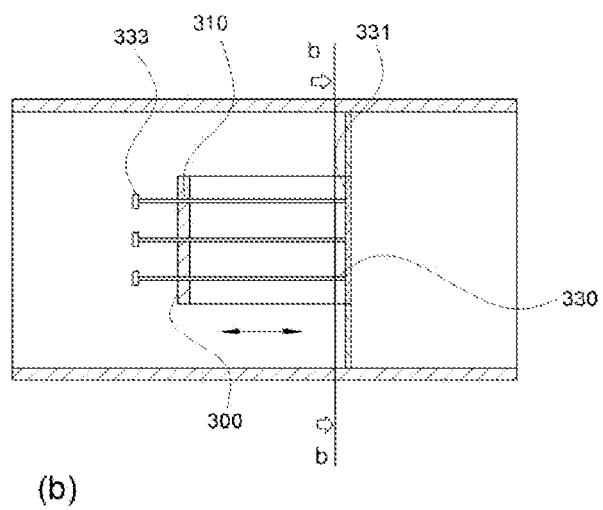
Figure 6A:
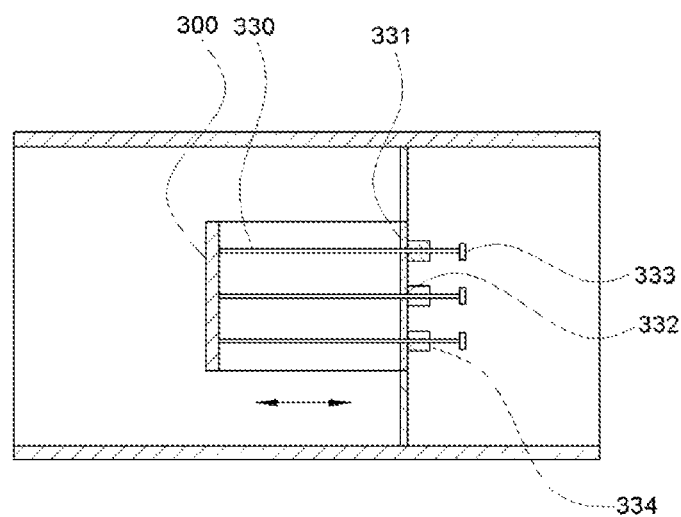
FIGS. 6A and 6B are configuration diagrams according to a fourth embodiment.
Figure 6B:
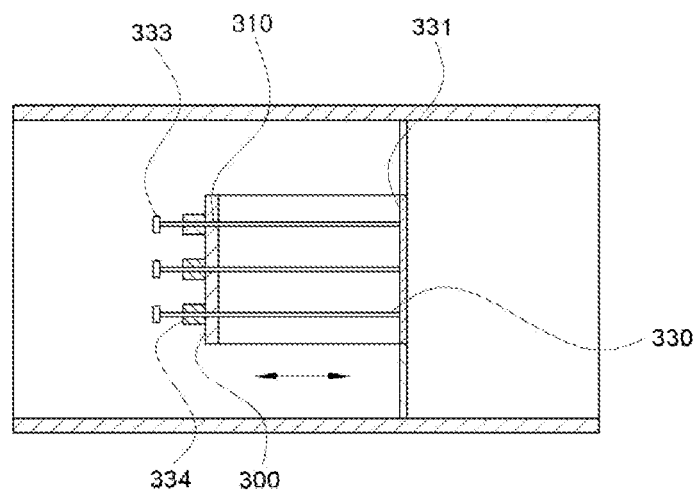

FIGS. 5A and 5B are configuration diagrams according to a fourth embodiment. Referring to FIG. 5A, a main plate 100 is formed to correspond to an inner diameter of a pipe, and is formed perpendicular to a fluid flow direction. The main plate 100 includes a through hole 110 which is formed at the center thereof and through which a fluid flows. A sub-plate 300 corresponding to a size of the through hole 110 is disposed in front of the main plate 100 so as to be applied with a pressure of the fluid. An expansion and contraction flow path 200 is formed in the shape of a column connecting the through hole 110 and a circumference of the sub-plate 300 to each other. A side surface of the expansion and contraction flow path 200 may include a plurality of holes 210 through which the fluid may pass and which have a circular shape or a polygonal shape. Alternatively, a side surface of the expansion and contraction flow path 200 may be formed in a pattern shape such as a grid shape, a rhombic shape, or a honeycomb shape. A plurality of guides 330 having a rod shape are formed on a rear surface of the sub-plate 300. The plurality of guides 330 allow the sub-plate 300 and the expansion and contraction flow path 200 to be balanced so as not to be damaged. The guides 330 may be disposed in parallel with each other or radially according to a fluid flow. In addition, the guides 330 may be formed to penetrate through the through hole 110. The guides 330 may penetrate through the main plate 100 to move in a front and rear direction of the fluid flow according to a hydraulic pressure acting on the sub-plate 300. In addition, a support frame 331 supporting the guides 330 is disposed in the through hole 110. The support frame 331 includes through holes 332 formed at positions corresponding to the guides 330. In addition, the guides 330 include catching portions 333 formed at the other ends thereof so as not to be separated. Referring to FIG. 5B, the sub-plate 300 includes holes 310 formed therein. One ends of the guides 330 are fixed to the support frame 331, and are disposed to penetrate through the holes 310. In addition, the other ends of the guides 330 at which the catching portions 333 are formed support the expansion and contraction flow path 200. Referring to FIG. 6A, guide portions 334 are additionally configured in FIG. 5A. The guide portions 334 are disposed on a lower surface of the support frame 331 and have an inner diameter corresponding to the through holes 332. The guide portions 334 are formed to prevent the movement of the guides 330. Referring to FIG. 6B, guide portions 334 are additionally configured in FIG. 5B. The guide portions 334 are disposed on a front surface of the sub-plate 300 and have an inner diameter corresponding to the holes 310. The guide portions 334 are formed to prevent the movement of the guides 330.

In addition, although not illustrated in the drawings, the flow rate control device 1000 according to the present disclosure may be combined with the first embodiment, the second embodiment, the third embodiment, or the fourth embodiment described above to form one flow rate control device. As an embodiment, the hole 310 and the conical portion 320 of the third embodiment and the guides 330 of the fourth embodiment may be provided together. However, the present disclosure is not limited thereto, and various combinations are possible.

[5] Conventional Hydraulic-Pneumatic System

Figure 7A:
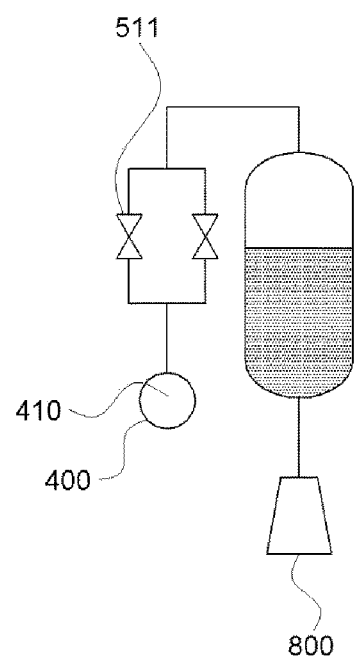
FIGS. 7A and 7B are configuration diagrams of a conventional hydraulic-pneumatic system.
Figure 7B:
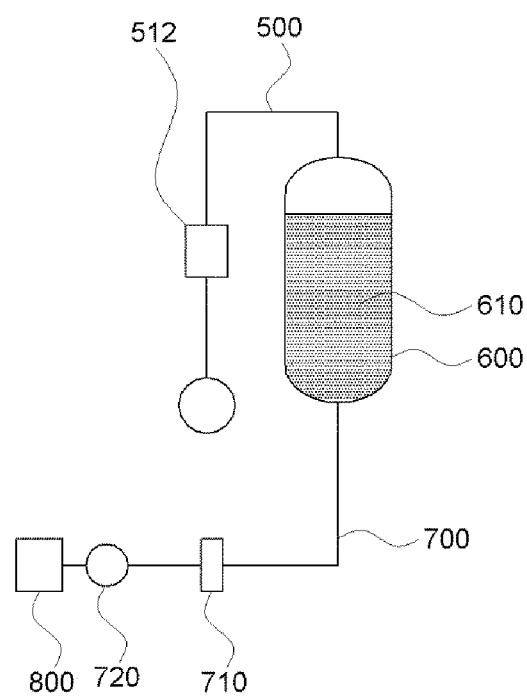

FIGS. 7A and 7B are configuration diagrams of a conventional hydraulic-pneumatic system. Referring to FIGS. 7A and 7B, a hydraulic-pneumatic system for controlling a flow rate of a projectile includes a pressurization gas tank 400 including a pressurization gas 410, a propellant tank 600 including a propellant 610, a first flow path 500 connecting the pressurization gas tank 400 and the propellant tank 600 to each other, and a second flow path 700 connecting the propellant tank 600 and an engine or a ground facility tank 800 to each other. The first flow path 500 includes a subsystem 510 including a plurality of valves 511 or regulators 512 for controlling a flow rate of the pressurization gas 410. The propellant 610 in the propellant tank 600 is injected by a pressure of the introduced pressurization gas 410. The propellant 610 is injected into the engine or the ground facility tank 800. The engine includes a flow rate pump, such that a constant flow rate of propellant is injected into the engine, but at the time of a ground test, a flow rate is controlled through an orifice or flow rate control valve 710 instead of the engine and the test is performed.

Figure 8A:
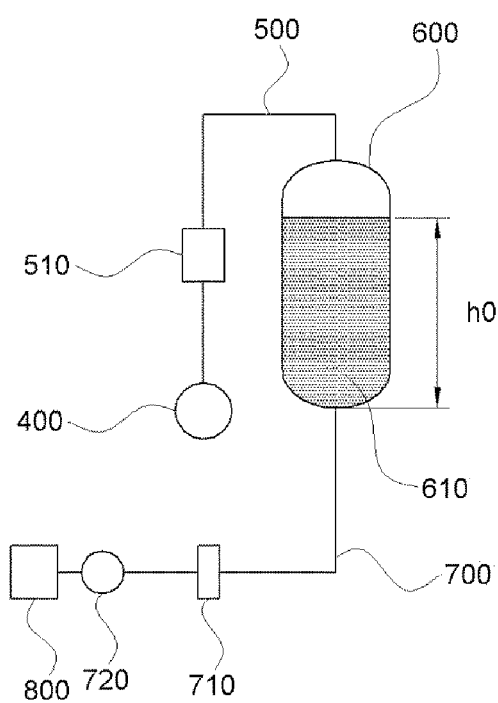
FIGS. 8A and 8B are views illustrating a change in a level of a propellant tank with the passage of time.
Figure 8B:
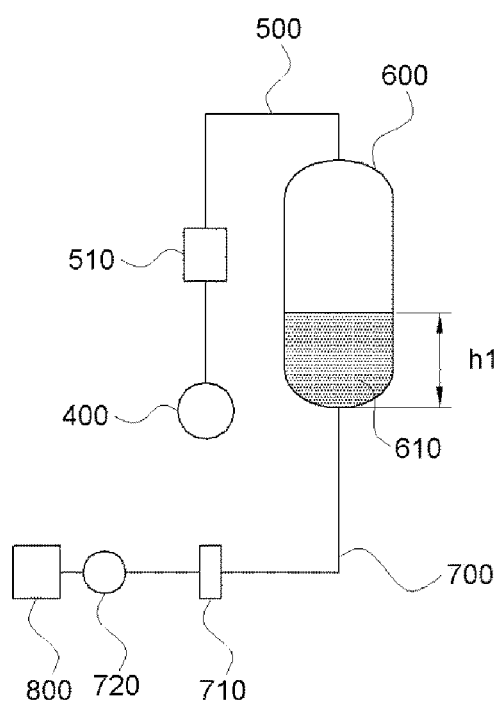

FIGS. 8A and 8B are views illustrating a change in a level of a propellant at the time of a ground test. In order to test performance and reliability of the subsystem 510 excluding the engine in a projectile development process, a ground comprehensive test is performed. An actual projectile supplies a constant flow rate of propellant 610 to the engine using a pump of the engine. However, even at the time of the comprehensive test in which the engine is not mounted, all the subsystem 510 are operated as in a real situation, and the propellant is discharged into the ground facility tank 800 by pressurizing the propellant tank 600. Since the propellant 610 is discharged by a pressure and gravity in the propellant tank 600 without the engine 800, a flow rate of the discharged propellant is not constant. Referring to FIGS. 8A and 8B, at the time of discharging the propellant 610, with the passage of time, a head pressure h by a level of the propellant decreases from h0 to h1, and the flow rate of the discharged propellant also tends to decrease. Accordingly, the orifice or flow rate control valve 710 is mounted to control the flow rate of the propellant. When the orifice is applied, a flow rate of the supplied propellant decreases with the passage of time, and in a case where feedback control is performed by applying the flow rate control valve 710, the flow rate may be made to be constant to some extent, but a complicated valve and control system are required. Changes in pressure, temperature, and the like, inside the propellant tank 600 are different from those in the real situation, and there is a limit to simulating a flight situation.

[6] Hydraulic-Pneumatic System According to the Present Disclosure

Figure 9A:
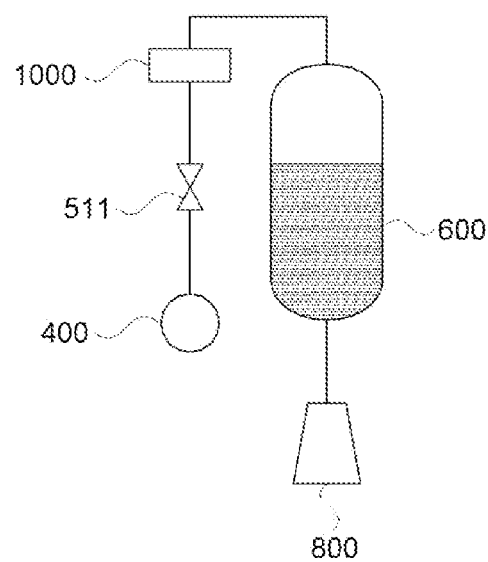
FIGS. 9A and 9B are views illustrating a hydraulic-pneumatic system to which the present disclosure is applied.
Figure 9B:
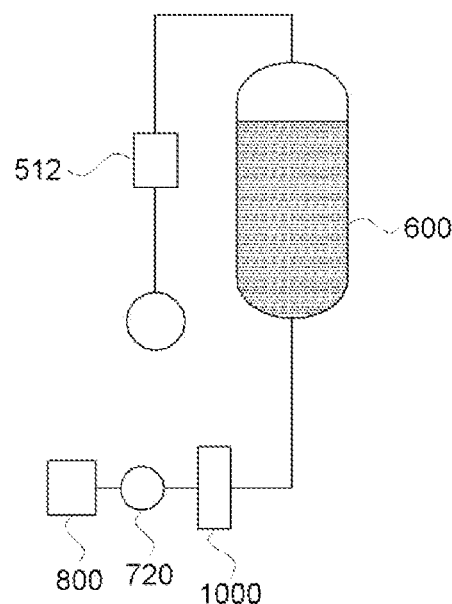

FIGS. 9A and 9B are views illustrating a hydraulic-pneumatic system to which the present disclosure is applied. Referring to FIG. 9A, the existing subsystem 510 using the plurality of valves 511 or the regulator 512 is replaced with a single valve and the flow rate control device 1000 according to the present disclosure. Referring to FIG. 9B, the orifice or flow rate control valve 710 of the second flow path 700 is replaced with the flow rate control device 1000 according to the present disclosure. For this reason, a flow rate of a supplied propellant may be maintained at a constant level without using a complicated control system. It is possible to simulate an internal situation of the propellant tank 600 similar to a real flight situation. In addition, a propellant supply system may be simplified to increase reliability and decrease a cost.

Figure 10A:
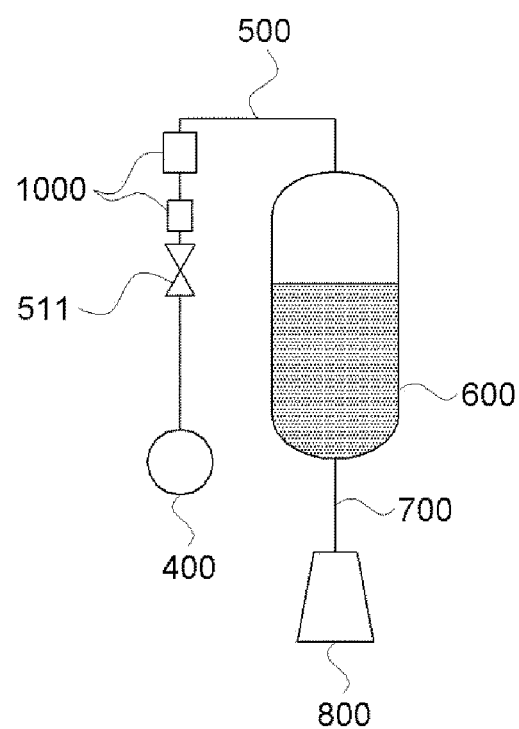
FIGS. 10A and 10B are views illustrating a hydraulic-pneumatic system to which the present disclosure is applied plural times.
Figure 10B:
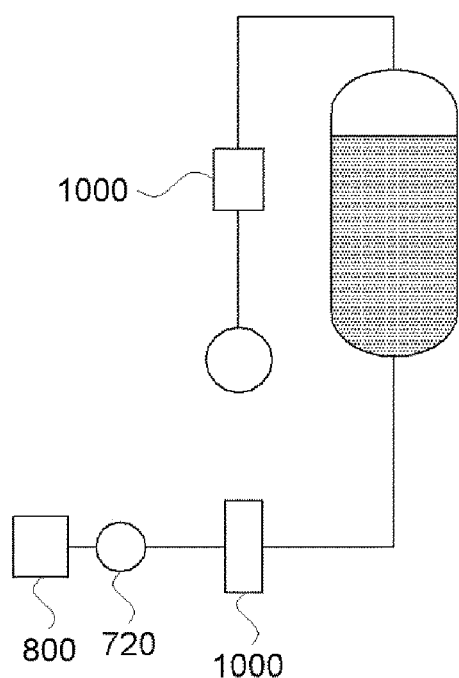

FIGS. 10A and 10B are views illustrating a hydraulic-pneumatic system to which a plurality of flow rate control devices 1000 according to the present disclosure are applied. Referring to FIG. 10A, a single valve and a plurality of flow rate control devices 1000 may be disposed in the first flow path 500, and referring to FIG. 10B, the subsystem 510 of first flow path 500 and the orifice 710 of the second flow path 700 may be replaced with flow rate control devices 1000. In addition, although not illustrated in the drawings, a plurality of flow rate control devices 1000 may be installed in the second flow path 700.

Figure 11A:
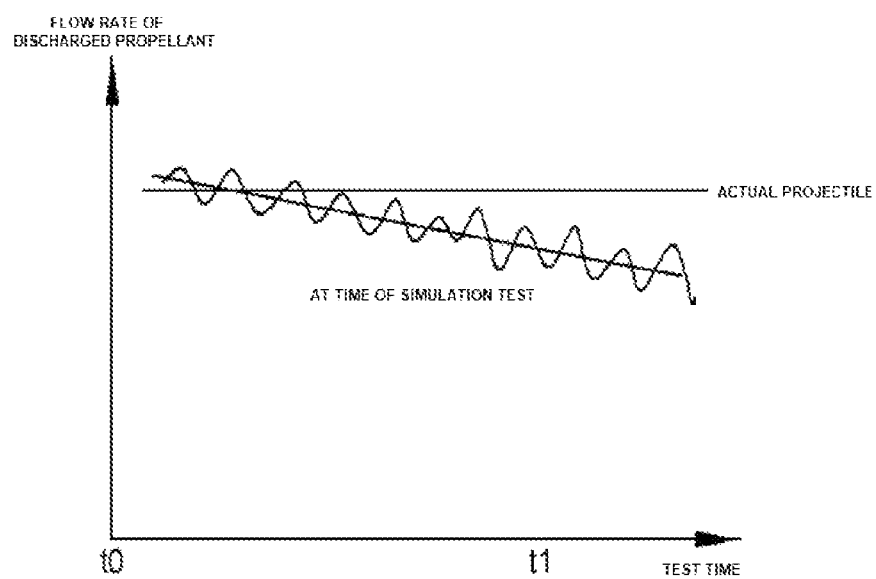
FIGS. 11A and 11B are views illustrating a change in a flow rate of a discharged propellant at the time of a ground test.
Figure 11B:
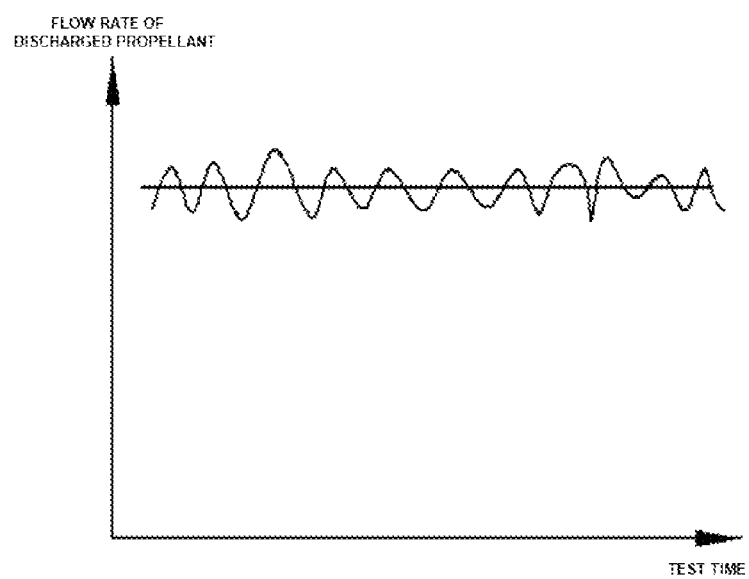

FIGS. 11A and 11B are views illustrating a change in a flow rate of a discharged propellant at the time of a ground test. Referring to FIG. 11A, which illustrates a change in a flow rate of a discharged propellant over time in a state in which the subsystem 510 is disposed in the first flow path 500 and the orifice 710 is disposed in the second flow path 700, it can be seen that an average flow rate gradually decreases at the time of a simulation test on the ground. It can be seen that an environment is different from a test environment of the actual propellant because the subsystem and the orifice cannot replace the pump of the engine. FIG. 11B is a graph when a test is performed in a state in which the orifice 710 of the second flow path 700 is replaced with the flow rate control device 1000 according to the present disclosure. It can be seen that a flow rate by the pump of the engine and an average flow rate when the flow rate control device according to the present disclosure is applied are the same as each other, and it can be seen that the flow rate control device very effectively acts on the test.

The present disclosure is not limited to the embodiments described above, and may be applied to various fields. In addition, the present disclosure may be variously modified by those skilled in the art to which the present disclosure pertains without departing from the gist of the present disclosure claimed in the claims.

[Detailed Description of Main Elements]

| | |
|---|---|
| 1: | inlet |
| 2: | outlet |
| 1000: | flow rate control device |
| 100: | main plate |
| 110: | through hole |
| 200: | expansion and contraction flow path |
| 210: | hole |
| 300: | sub-plate |
| 310: | hole |
| 320: | conical portion |
| 330: | guide |
| 331: | support frame |
| 332: | through hole |
| 333: | catching portion |
| 334: | guide portion |
| 400: | pressurization gas tank |
| 410: | pressurization gas |
| 500: | first flow path |
| 510: | subsystem |
| 511: | valve |
| 512: | regulator |
| 600: | propellant tank |
| 610: | propellant |
| 700: | second flow path |
| 710: | orifice, flow rate control valve |
| 720: | flow rate meter |
| 800: | engine, ground facility tank |
| P: | force applied to sub-plate |
| L: | length of expansion and contraction flow path |
| A: | cross-sectional area of hole |
| h: | head pressure of propellant tank |

What is claimed is:

1. A flow rate control device formed inside a pipe through which a fluid flows, comprising:
    a main plate formed inside the pipe so as to face a fluid flow direction and including a through hole formed at the center thereof, the through hole having a perimeter;
    a sub-plate disposed in front of the through hole of the main plate, the sub-plate having a circumference, and corresponding to the size of the through hole; and
    a cylindrical column connecting the perimeter of the through hole and the circumference of the sub-plate to each other, the column having a length from the through hole to the sub-plate, the column including a side surface and a plurality of holes in the side surface for discharging the fluid through the column, the plurality of holes being formed in a circular shape or a polygonal shape, and wherein the plurality of holes are configured to be expanded and contracted by a pressure applied to the sub-plate; and
    wherein the sub-plate is displaced by inflowing fluid, and wherein the column has a compliant structure such that the length of the column decreases as the sub-plate is displaced by the inflowing fluid, and
    wherein a hole is formed at the center of the sub-plate, and ends of a plurality of guides having a rod shape are attached to a rear surface of the sub-plate.

2. The flow rate control device of claim 1, wherein the column is expanded and contracted in a front and rear direction of a fluid flow according to a magnitude of the pressure applied to the sub-plate, such that a flow rate of the discharged fluid becomes uniform.

3. The flow rate control device of claim 1, wherein the main plate, the sub-plate, and the column are formed integrally with each other.

4. The flow rate control device of claim 1, wherein the sub-plate includes a center hole formed at the center thereof, and includes a conical portion having a cross-sectional area gradually decreasing from the center hole in the fluid flow direction and formed in a depressed shape, to prevent the sub-plate from leaning to one side.

5. The flow rate control device of claim 1, wherein other ends of the guides are supported by a guide support frame installed in the through hole and are formed to penetrate through the through hole.

6. The flow rate control device of claim 5, wherein the guide support frame includes holes through which the guides extend.

7. A hydraulic-pneumatic system including a flow rate control device formed inside a pipe through which a fluid flows, injecting a propellant inside a propellant tank by a pressure in a pressurization gas tank, wherein the flow rate control device comprises:
    a main plate formed inside the pipe so as to face a fluid flow direction and including a through hole formed at the center thereof, the through hole having a perimeter;

a sub-plate disposed in front of the through hole of the main plate, the sub-plate having a circumference, and corresponding to the size of the through hole; and a cylindrical column connecting the perimeter of the through hole and the circumference of the sub-plate to each other, the column having a length from the through hole to the sub-plate, the column including a side surface and a plurality of holes in the side surface for discharging the fluid through the column, the plurality of holes being formed in a circular shape or a polygonal shape, and wherein the plurality of holes are configured to be expanded and contracted by a pressure applied to the sub-plate, wherein the sub-plate is displaced by inflowing fluid, and wherein the column has a compliant structure such that the length of the column decreases as the sub-plate is displaced by the inflowing fluid, wherein the flow rate control device further comprises: a first flow path connecting the pressurization gas tank and the propellant tank to each other; and a second flow path connecting the propellant tank and an engine or a ground facility tank to each other, wherein the flow rate control device is provided in the first flow path, such that a pressurization gas of the pressurization gas tank constantly pressurizes the propellant, and wherein the flow rate control device is provided in the second flow path to inject a constant flow rate of the propellant regardless of an influence of the engine, and wherein a plurality of holes are formed in the sub-plate for balancing the sub-plate and preventing the sub-plate from being biased toward one side.

\* \* \* \* \*